United States Patent [11] 3,610,679

| [72] | Inventor | Louis Amato |
| | | 69 Winfield Ave., St. George, Staten Island, N.Y. 10305 |
| [21] | Appl. No. | 33,702 |
| [22] | Filed | May 1, 1970 |
| [45] | Patented | Oct. 5, 1971 |

[54] AUTO SAFETY SEAT AND DOOR LOCK
5 Claims, 7 Drawing Figs.

[52] U.S. Cl. .................................................. 296/65 A, 296/146, 297/216
[51] Int. Cl. .................................................. B60r 21/10
[50] Field of Search .................................................. 296/65 A, 146; 297/216

[56] References Cited
UNITED STATES PATENTS

| 2,872,241 | 2/1959 | Shelden | 296/65 A |
| 2,952,490 | 9/1960 | Pfaff | 296/65 A |
| 2,970,862 | 2/1961 | Racine | 296/65 A |

*Primary Examiner*—Benjamin Hersh
*Assistant Examiner*—Leslie J. Paperner

ABSTRACT: Specially constructed seats in a vehicle move forward and tilt upward upon front or head-on collision to turn occupants away from dashboard and windshield. At the same time, these seats lock the doors closed in place to prevent occupants from being thrown out of the vehicle upon impact.

PATENTED OCT 5 1971 3,610,679

INVENTOR.
LOUIS AMATO

AUTO SAFETY SEAT AND DOOR LOCK

SUMMARY OF THE INVENTION

Ornament designed chrome plated steel castings are bolted on each front door. When doors are closed recess fits over steel wheel and guide. Upon heavy impact to front or head-on collision seat will go in forward direction into dashboard area, along with occupants in front. This arrangement, seat travels in forward direction but guide rod carries seat along recessed panel in forward and upward direction turning occupants away from dashboard and windshield. Steel rod with wheel now applied into recess keeps both front doors from flying open, causing a safety lock. Lock can be made adjustable and applied in recess for safety of intersection side collisions to hold doors closed. This would keep occupants from being thrown out of car into street.

Advantages of this type seat arrangement are:
1. Simplicity of design.
2. Can be installed on any type auto now in production.
3. Can be installed by the average layman.
4. Positive action — foolproof; seat can be made to leave tracks with either shear pins, spring clips, etc.
5. Occupants may suffer foot or knee injury or none at all, rather than fatal chest or head injury.
6. Steel wheel can have a hand pull pin to release doors.
7. Unit can be made to fit any car and installed on a franchise basis at a minimum of initial cost for material.
8. Arrangement can be installed in trucks and forward section of passenger and children's buses.
9. Steering wheel spokes can be made to shear when driver's knees pass steering wheel.
10. Can be installed on assembly line now without changing existing seat or door design other than extension on door handle or window regulator control if needed.

DETAILED DESCRIPTION OF PREFERRED EMBODIMENTS

Figure 1:
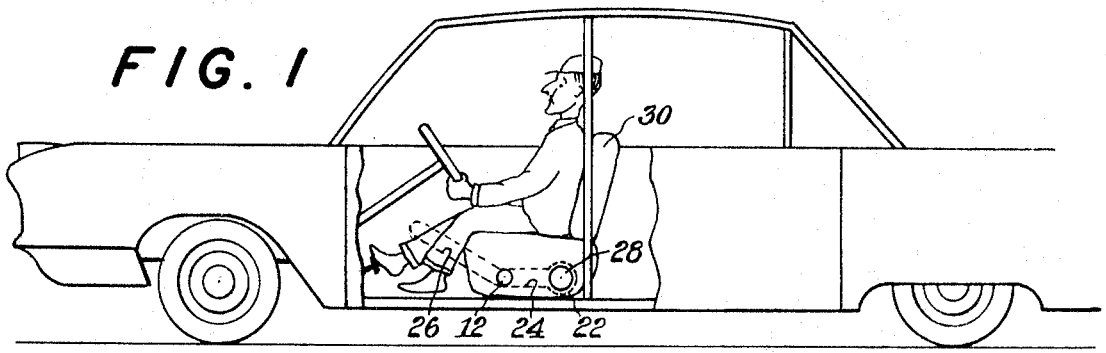
FIG. 1 is a cross-sectional view of a vehicle using my invention showing normal driving position.
Figure 2:
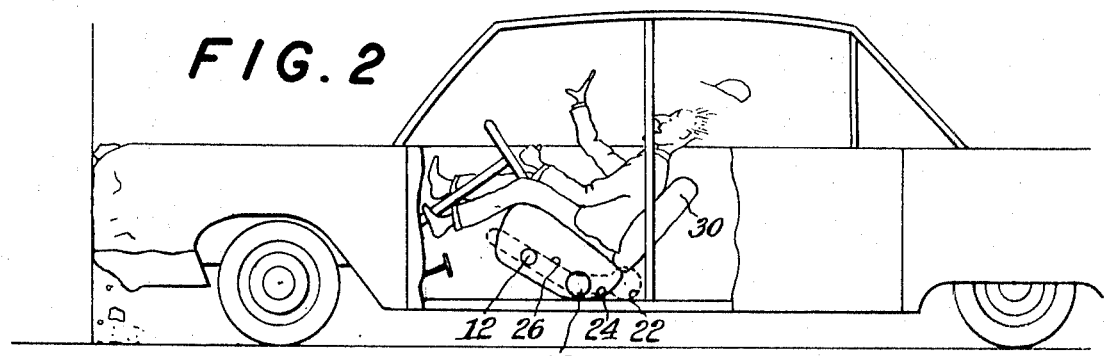
FIG. 2 is a view similar to FIG. 1 but showing position after impact.
Figure 4:
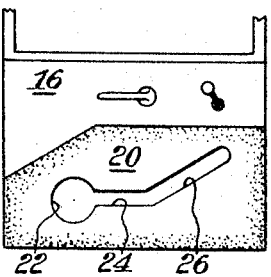
FIGS. 4 and 5 show the slotted recessed opposite door panels.
Figure 3:
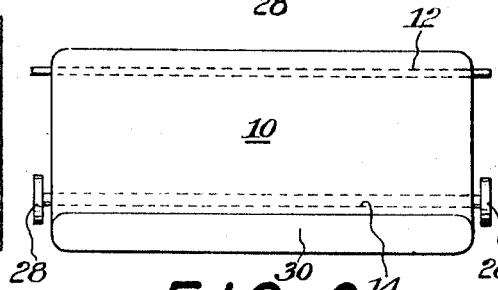
FIG. 3 is a top view of the front seat.
Figure 5:
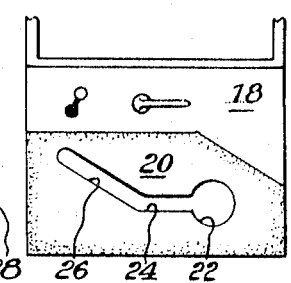
Figure 6:
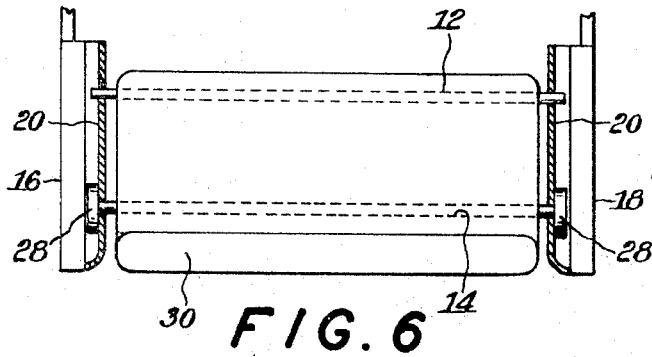
FIG. 6 is a top view of the front seat as engaged with the door panels.

Referring now to FIGS. 1–6, the base 10 of a front seat contains two parallel spaced transversely extending 1-inch diameter steel rods 12 and 14 which extend outward from each side of the seat.

The left-hand door 16 and the right-hand door 18 each carry ornamental design steel recessed inside panels 20. Each panel has a slot with an enlarged circular opening 22 at the rear connected by a forward extending horizontal section 24 to an upwardly inclined section 26 extending additionally forward.

Opposite ends of rod 12 are normally disposed and ride in section 24. Opposite ends of rod 14 terminate in wheels 28 fitting in opening 22. In normal use, the doors can be opened and closed causing the panels to disengage from and reengage with the rods.

Upon head-on or severe front impact, the front seat moves forward, with ends of rod 12 moving forward and upward in section 26 causing the seat to tip with the back 30 extending inclinedly rearward. The wheels 28 move forward behind section 24 thus, since the wheels are too large to be pulled through section 24, locking the doors closed with the advantages and results indicated.

Figure 7:
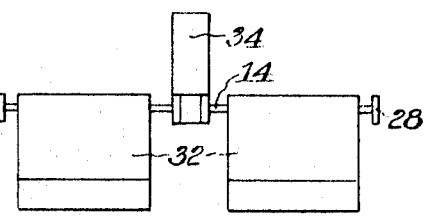
FIG. 7 shows a modified form of front seat.

FIG. 7 shows a front seat in the form of two bucket seats 32 with an arm arest 34 therebetween.

While I have described my invention with particular reference to the drawings such is not to be considered as limiting its actual scope.

Having thus described this invention what is asserted as new is:

1. In combination with a vehicle having a front seat and oppositely disposed doors:
   first and second horizontal parallel elongated members secured in said seat and extending transversely to the longitudinal direction of the vehicle, the ends of the members extending outward from each side of the seat; and
   means disposed in the doors and engaging the opposite ends of the members to enable the seat to remain in normal position and the doors to be opened and closed during normal driving and to tilt the seat rearward and to turn the occupants away from dashboard and windshield and at the same time lock the doors closed upon severe head-on or front impact.

2. The combination as set forth in claim 1 wherein said means includes inside recessed panels having aligned slots in which the opposite ends of the members are disposed.

3. The combination as set forth in claim 2 wherein said slots each have an enlarged circular opening, a first section extending horizontally forward from the opening, and a second section extending inclinedly forward and upward from the first section.

4. The combination as set forth in claim 3 wherein the ends of the first member in normal driving engage the first slot sections and upon impact engage the second slot sections.

5. The combination as set forth in claim 4 wherein opposite ends of the second member terminate in wheels, the wheels engaging the circular openings in normal driving and engaging the first slot sections upon impact.